(12) United States Patent
Hieb et al.

(10) Patent No.: US 12,118,229 B2
(45) Date of Patent: *Oct. 15, 2024

(54) MEMORY SUB-SYSTEM EVENT LOG MANAGEMENT

(71) Applicant: Micron Technology, Inc., Boise, ID (US)

(72) Inventors: Adam J. Hieb, Meridian, ID (US); Adam C. Guy, Boise, ID (US); Sanjay Tiwari, Meridian, ID (US); Todd A Marquart, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/946,885

(22) Filed: Sep. 16, 2022

(65) Prior Publication Data

US 2023/0017942 A1 Jan. 19, 2023

Related U.S. Application Data

(63) Continuation of application No. 17/004,135, filed on Aug. 27, 2020, now Pat. No. 11,449,266.

(51) Int. Cl.
*G06F 11/00* (2006.01)
*G06F 3/06* (2006.01)
*G06F 11/07* (2006.01)

(52) U.S. Cl.
CPC .......... *G06F 3/0653* (2013.01); *G06F 3/0604* (2013.01); *G06F 3/0673* (2013.01); *G06F 11/0727* (2013.01); *G06F 11/076* (2013.01); *G06F 11/0778* (2013.01)

(58) Field of Classification Search
CPC .............. G06F 11/0727; G06F 11/076; G06F 11/0778; G06F 11/073; G06F 11/0754; G06F 11/0751; G06F 11/0766; G06F 11/0787

See application file for complete search history.

(56) References Cited

U.S. PATENT DOCUMENTS

| | | |
|---|---|---|
| 6,967,804 B1 | 11/2005 | Codilian |
| 7,043,383 B2 | 5/2006 | Lee et al. |
| 7,965,654 B2 | 6/2011 | Klincewicz et al. |
| 2016/0277268 A1 | 9/2016 | Brown |
| 2020/0151043 A1 | 5/2020 | Chertov |
| 2020/0184072 A1 | 6/2020 | Ikeda |

OTHER PUBLICATIONS

Elastic, Manage detection alerts, Aug. 8, 2020, https://www.elastic.co/, 6 pages (Year: 2020).*

* cited by examiner

*Primary Examiner* — Katherine Lin
(74) *Attorney, Agent, or Firm* — Brooks, Cameron & Huebsch, PLLC

(57) ABSTRACT

A system includes a memory device and a processing device coupled to the memory device. The memory processing device can perform operations including receiving data indicative of occurrence of a plurality of events. The processing device can perform operations including determining an event log type for each of the plurality of events. The processing device can perform operations including storing an identifier associated with each of the determined event log types. The processing device can perform operations including updating a counter value associated with each identifier in response to occurrence of an event associated with the respective identifier.

16 Claims, 4 Drawing Sheets

MEMORY SUB-SYSTEM EVENT LOG MANAGEMENT

PRIORITY INFORMATION

This application is a Continuation of U.S. application Ser. No. 17/004,135, filed on Aug. 27, 2020, the contents of which are incorporated herein by reference.

TECHNICAL FIELD

Embodiments of the disclosure relate generally to memory sub-systems, and more specifically, relate to memory sub-system event log management.

BACKGROUND

A memory sub-system can include one or more memory devices that store data. The memory devices can be, for example, non-volatile memory components and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
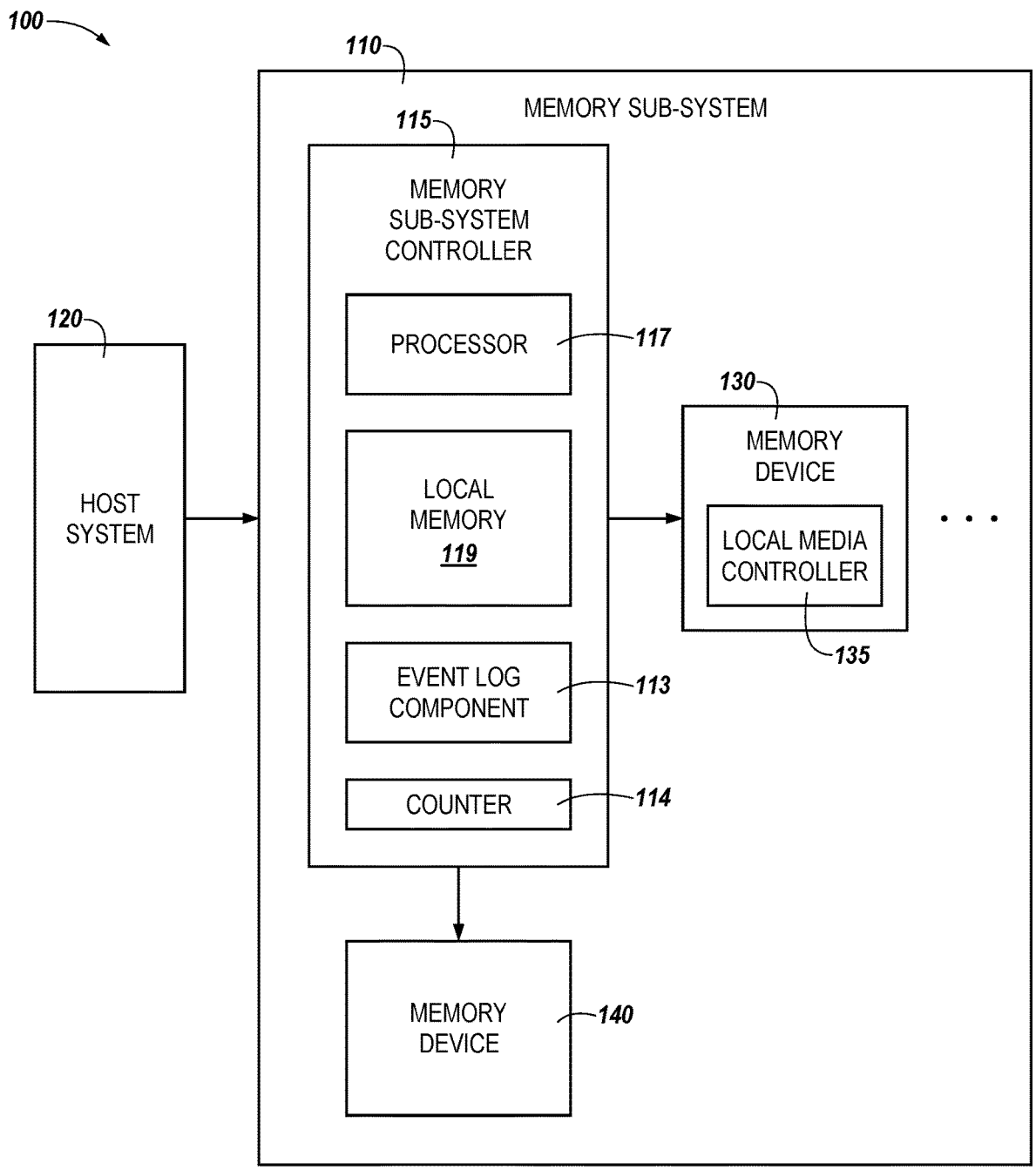
FIG. 1 illustrates an example computing system that includes a memory sub-system in accordance with some embodiments of the present disclosure.

Aspects of the present disclosure are directed to memory sub-system event log management, in particular to memory sub-systems that include an event log component. A memory sub-system can be a storage system, storage device, a memory module, or a combination of such. An example of a memory sub-system is a storage system is a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

An SSD is a type of memory sub-system that uses integrated circuit assemblies to store data persistently, typically using flash memory. An SSD can include memory devices that include one or more arrays of memory cells. The performance and/or endurance of an SSD can be related to the type(s) of memory cells employed by the SSD. In general, as the quantity of bits stored per cell increases, the endurance of the SSD (e.g., the amount of program-erase (PE) cycles, which can correspond to the quantity of reads or writes that can be performed on any given cell before the cells become unreliable) tends to decrease. This decrease can lead to errors and can cause events that are performed by the SSD to fail or not occur correctly.

Monitoring and detecting occurrences of particular SSD events, particularly in response to when a request to perform the events has occurred, can be beneficial. Event logs can be generated that indicate a listing of the events that the SSD has performed. An event log is a detailed record of system, security, and application notifications stored and used to diagnose system problems and predict possible system issues. However, parsing an entire event log can take considerable resources when testing thousands of SSDs. In the case of larger drives, it may not be possible to parse all of the drives and some event log entries may be missing.

Aspects of the present disclosure address the above and other deficiencies by generating histogram data and an event log histogram to display in order to provide considerably more data than may be currently available. By generating an event log histogram, event logs can be more quickly and efficiently analyzed with more limited impact on quality of service (QoS) and can provide for additional resources to monitor the event logs. In addition, event log histograms can provide monitoring of a frequency of non-critical events that may occur to ensure that what is being requested to be performed by the SSD is actually occurring. Such analysis may be missed or have too large an impact on QoS if only a subset of the event logs were summarized or only a portion of the event logs were able to be analyzed during a particular period of time. An advantage of the present disclosure includes dynamically monitoring the event logs and adjusting characteristics of how the events are being performed in response to the monitoring. Embodiments described herein include an event log component resident on the memory sub-system (e.g., on the memory sub-system controller), to make it possible to perform monitoring and organizing of the event logs.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of memory modules include a dual in-line memory module (DIMM), a small outline DIMM (SO-DIMM), and various types of non-volatile dual in-line memory modules (NVDIMM). Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., and SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 115 includes an event log component 113 that can be configured to orchestrate and/or perform operations to manage events that are logged in association with data processing related to various components, data components, and/or interfaces of the memory sub-system 110. As an example, the event log component 113 can monitor events including event frequency, event initiation, event completion, whether an event has been requested, etc. The memory sub-system controller 115 includes a counter 114 that is in communication with the event log component 113 and can be used to monitor and record a frequency of each of the events that occur. In some embodiments, the counter 114 can be storage in SRAM or DRAM that maintains a count of a particular event log occurrence.

The events can be logged as histogram data and/or structured into a histogram chart or graph in order to organize the event logs for analysis and processing. Event logs can be used to record important hardware and software actions that can be used to troubleshoot issues with the operating system. The event logs can track specific events in its log files, such as application installations, security management, system setup operations on initial startup, and problems or errors within the system. An event log can include a date, time, user information, computer information, an event identification (ID), a source (indicating a program or component that caused the event), a type of event (including information, warning, error, security success audit, or security failure audit), etc.

Events can be categorized into different types including application, security, setup, system, and forwarded events, among others. Application events can refer to incidents with installed software on a local computer. A security event can refer to events based on audit policies such as login attempts and resource access. Setup events can refer to events that include enterprise-focused events relating to the control of domains, such as the location of logs after a disk configuration. System events can refer to incidents that are system specific, such as the status of device drivers. Forwarded events can refer to events that are received from external devices on a same network in a situation where a system gathers multiple logs that are not all associated with system itself.

Although not shown in FIG. 1 so as to not obfuscate the drawings, the event log component 113 can include various circuitry to facilitate grading and allocation of the sets of memory cells. For example, the event log component 113 can include a special purpose circuitry in the form of an ASIC, FPGA, state machine, and/or other logic circuitry that can allow the event log component 113 to orchestrate and/or perform operations to manage the occurrence of events associated with various components, data elements, and/or interfaces of the memory sub-system 110 and transfer the event log information and/or the event log histogram to other various components of the memory sub-system 110. The event log component 113 can sense and/or monitor the occurrence of multiple events over a period of time or at different time intervals and feed back the event log data into the event log histogram and other event log data structures.

As described below, the event log component 113 can be communicatively coupled to the memory devices 130 and can access the memory device 130, the memory device 140, internal data paths of the memory sub-system 110, and/or interfaces of the memory sub-system 110 to perform the operations described herein and/or to monitor events associated with such elements. In some embodiments, the operations performed by the event log component 113 can be performed during an initialization or pre-initialization stage of data transfer within the memory sub-system 110 and/or the memory sub-system controller 115. Accordingly, in some embodiments, the event log component 113 can perform the operations described herein prior to data transfer in order to determine a size of data to transfer (e.g., an amount of events that may occur) or a data transfer speed (e.g., a frequency of events) to initially monitor. During the initial data transfer, additional event log entries can be obtained and the size of the data transferred or the data transfer speed can be adjusted in order to adjust the event log data.

Figure 2:
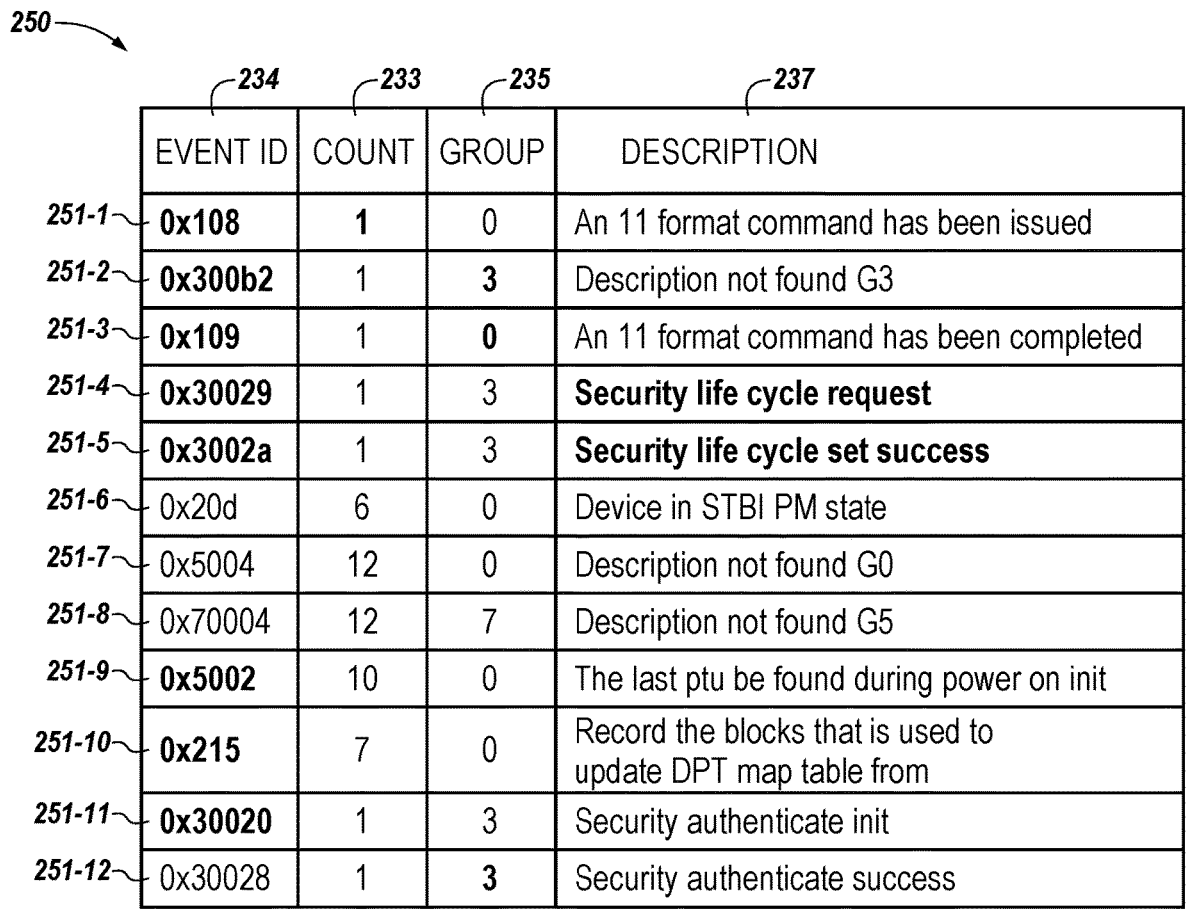
FIG. 2 illustrates an example of a memory sub-system event log counter table in accordance with some embodiments of the present disclosure.

FIG. 2 illustrates an example of a memory sub-system event log counter table 250 in accordance with some embodiments of the present disclosure. The event log counter table 250 can include a plurality of entries 251-1 to 251-12 (hereinafter referred to collectively as plurality of entries 251) and can be used to generate an event log histogram. The event log counter table 250 can be stored in non-volatile memory, such as memory device 130 in FIG. 1, which can include NAND, 3D cross-point, NOR, etc. Each of the plurality of entries 251 can include an event identification ("Event ID") 234, a count value ("Count") 233, a group number ("Group") 235, and a description 237. For example, a first entry 251-1 has an event ID 234 of "ox108," a count value of "1," a group number of "0," and a description of "An 11format command has been issued." In this example, the event ID 234 is an hexadecimal code that indicates an identification for that particular event in the entry. The count value 233 indicates the quantity of times, or frequency, that the event has occurred. The count value 233 can be determined and/or adjusted by a counter (e.g., counter 114 in FIG. 1) that monitors a frequency of an event. The group number 235 indicates the type of group that the event is within. The description 237 indicates which event has occurred in more detail.

Each event log type can be defined as a unique event log entry. As one example, the event log type can be a media error. A unique event log entry type can be defined as a 16-bit identifier (as was described as the hexadecimal code above and illustrated in FIG. 2). As one example, a log entry, such as entries 251, would be generated for storing a number of event log types as an 8-, 16-, or 32-bit unsigned value, however examples are not limited to these bit sizes and can include additional bit sizes. In some embodiments, firmware could determine a counter length based on a frequency and amount of time that the event would be displayed in the field. The types of events that can be logged and counted include media-related events and error-related events (e.g., DRAM ECC, etc.). In addition, counters of particular events can be given priority such that certain counts of events can be more critical to a response than others. As an example, a count of a first set of events occurring can be prioritized with a particular response over a count of a second set of events occurring. In this example, if a certain count of the first set occurs and the same count of the second set occurs, if a response is required to both, the response to the first set of events may be prioritized over the response to the second set of events.

Each time a particular event occurs again, and therefore would have been entered into a general event log, a count value 233 of an event is updated (e.g., incremented by a quantity of one). For example, in response to an additional occurrence of an event with an event ID 234 of "0x108" (as in the first entry 251-1), the count value 233 associated with event ID 234 of "0x108" would be incremented from "1" (as is currently illustrated in FIG. 2) to "2." In this way, an additional entry is not entered into the log but rather the count is incremented, thereby saving storage space and providing more efficient access to the event log data. As an example, a seventh entry 251-7 has a count 233 of "12" which would occupy twelve entry locations in a general event log. That is, the event indicated by the seventh entry 251-7 has occurred 12 times and that quantity is represented by the count 233 of "12." By using that general event log information and organizing it in such a way, as is illustrated in FIG. 2, a larger amount of data can be organized and processed with a more limited storage footprint. The table generated from the histogram data can be used to generate a histogram chart or graph. The histogram graph can be more efficiently analyzed and/or processed in order to evaluate a larger volume of data in a more efficient and faster amount of time based on the organization and ease of access of the data. In addition, an event log pareto can be accessed in order to generate the histogram data.

In some embodiments, a per hour time period event log can be generated in which the events that have occurred within a particular hour-long time period are logged and indicated for that time period. The time period data can be logged based on the counts accrued during that time period and flushed every hour to the main event log histogram. In some embodiments, firmware can be customized and a data decoder for each firmware can be built in order to decode that data associated with that firmware. In addition, software and/or a script may be generated to decode the data into relevant fields into structured data that could be illustrated to a user. As used herein, a "user" can refer to a human user (e.g., a person) or machine (e.g., a sub-system, process, host system, etc.) that provides instructions to the memory sub-system to cause the memory sub-system to perform a task or action.

Flushing of the data can include storing the event log data into non-volatile memory and also into the event log count data. Flushing of the events can occur on a periodic basis. For example, event log data can be flushed with each event log entry added to the event log and/or at every power down of the system. This event log flushing frequency for the event log count table can be based on a clean power cycle. Further, the counters can be reloaded on a reboot. In one example, the counters can be permanent for the life of the system from shipment. In one example, the counters can be saturated at a max value threshold. In one example, the count values could be flushed on a per hour time basis along with the event log data. As the frequency of the flush increases, the likelihood that event log data is lost is decreased.

In some embodiments, the event log histogram and corresponding counter (such as counter 114 in FIG. 1) would be limited in size from 4 k to 8 k of data and maintain the amount of data transferred in a log read to as small an amount of possible. As an example, for 1,700 events at 32 bits per event, there would be about 54,400 bits of data to store. However, each of the events may not use all 32 bits. In order to determine the best bit to event ratio, an architecture or firmware can be generated to estimate an estimated number of times an event would occur during a system's lifetime and a recommended amount of storage space for each associated counter. This can be an architecture design decision prior to operation or a number of operations can be performed to determine this estimate.

In some embodiments, an event log histogram generated from the event log count table 250 can be retrieved and analyzed to determine which critical and/or non-critical events have occurred, whether the events are occurring at a frequency and quantity that is expected, and whether adjustments to the system should be made based on a comparison of the expected and actual results.

Figure 3:
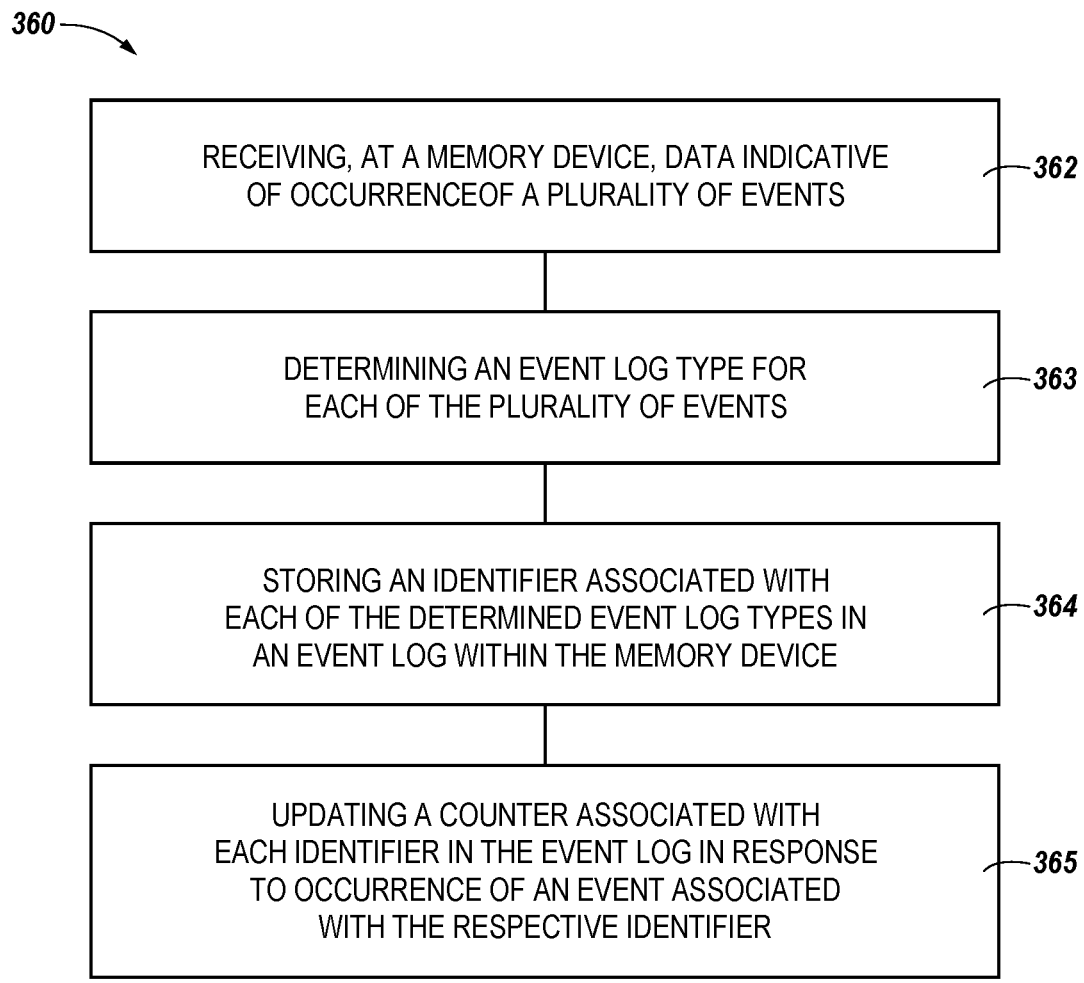
FIG. 3 is a flow diagram corresponding to a method for performing memory sub-system operations to manage event logs in accordance with some embodiments of the present disclosure.

FIG. 3 is a flow diagram corresponding to a method 360 for performing memory sub-system operations to monitor events in accordance with some embodiments of the present disclosure. The method 360 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. The method 360 can be triggered by an occurrence of a plurality of events. The memory sub-system can perform the plurality of events and these events can include system, security, and application events related to important software and hardware actions. The events can be recorded in log files and include such scenarios as application installations, security management, system setup operations on initial setup, and problems and/or errors.

At operation 362, the method 360 can include receiving, from a memory device, data indicative of occurrence of the plurality of events. The memory device can be analogous to the memory device 130 and/or the memory device 140 of FIG. 1. The received data can include an indication that a particular event has occurred and/or whether the particular event occurred when expected. The received data can include a portion of an event log or multiple event logs each corresponding to different portions of the system or different time periods that the system has been performing. The data can be received in response to a flushing of the data at a particular time interval, in response to a particular event occurring, etc.

At operation 363, the method 360 can include determining an event log type for each of the plurality of events. In some example, the event log type may have already occurred at least once. The determination can include an indication that the event log type has already occurred. At operation 364, the method 360 can include storing an identifier associated with each of the determined event log types in an event log within the memory device. The identifier can be an 8-bit, a 16-bit, or a 32-bit identifier and can include hexadecimal notation (as was described and illustrated in FIG. 2). The identifier can be associated with a count value, a group number, a description, and so forth, within the event log count table, as is illustrated in FIG. 2.

At operation 365, the method 360 can include updating a counter associated with each identifier in the event log in response to performance of an event associated with the respective identifier. As an example, in response to a determination that the event log type has not occurred before, the count value of the counter can be incremented from a "0" to a "1." In response to a determination that the event log type has occurred previously, the previous count value ("2" for the sake of this example) can be incremented by one (which would result in a "3", in this example).

In some embodiments, the memory device can be a volatile memory device and the memory device different than the memory device can be a non-volatile memory device (or vice versa). For example, the memory device can be a system memory device, such as a DRAM (e.g., a dual-ported RAM) memory device, and the memory device different than the memory device can be a storage device, such as a NAND memory device, a three-dimensional cross-point memory device, or other non-volatile memory device.

The method 360 can further include generating a histogram of a plurality of identifiers. The histogram can be generated using the data from the event log count table including the plurality of identifiers. The histogram can be generated including a corresponding plurality of counters indicating a quantity of times each event log type associated with each of the respective plurality of identifiers has occurred. Generating the histogram can include generating a histogram that indicates the quantity of times each event log type has occurred per period of time. The method 360 can further include determining that the event log type includes an error event. The method 360 can further include determining that the event log type include a non-critical event. The method 360 can further include storing the counters in a location of memory separate from a location of the identifiers. In one example, the counters can be stored in a header of an existing event log. As an example, The method 360 can further include determining a priority of the counters and corresponding event log types.

Figure 4:
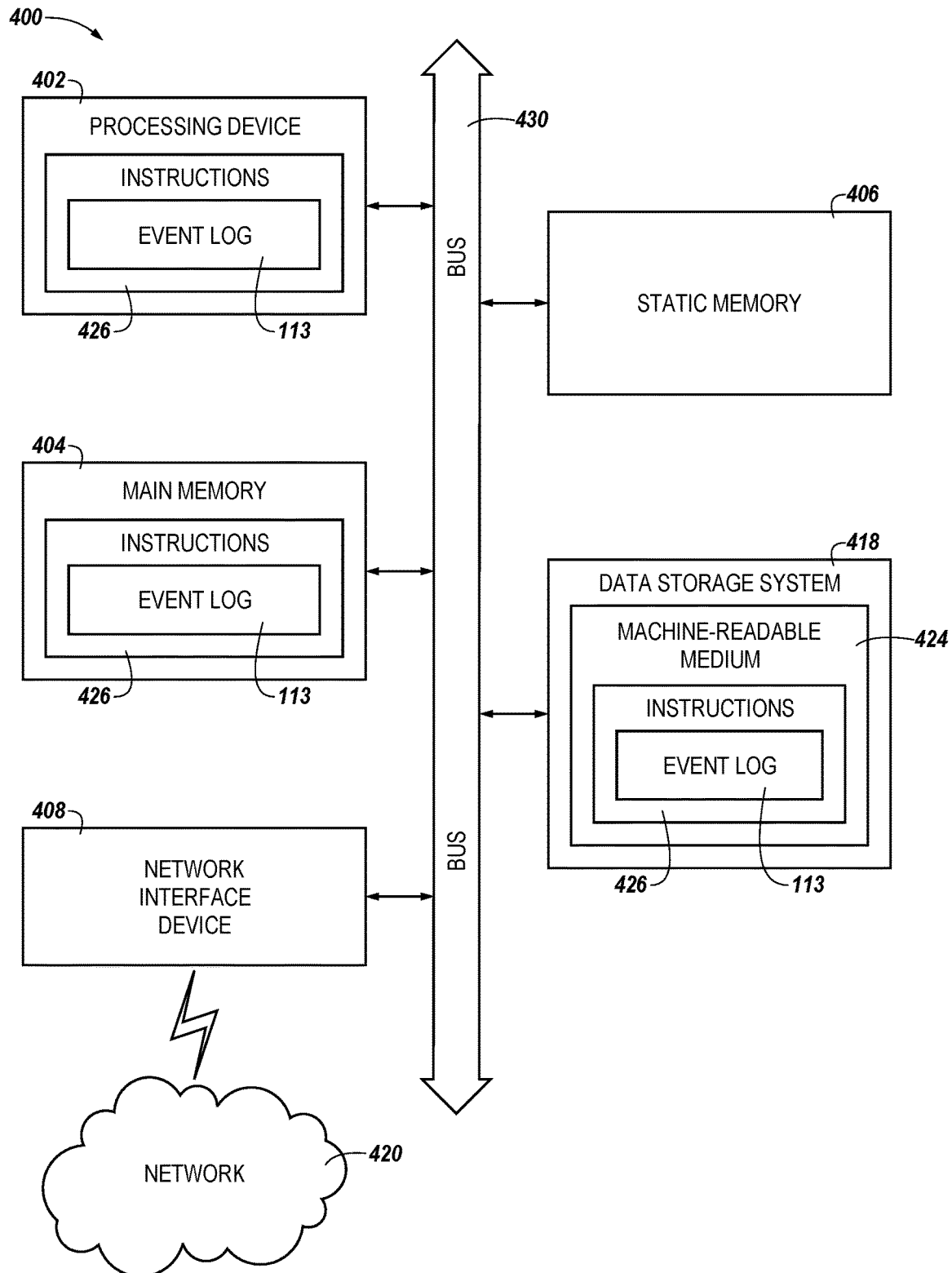
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the event log component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420. In some embodiments, the main memory 404 or system 418 can be an SSD such as is described in association with FIGS. 1-2.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to an event log component (e.g., the event log component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a memory device; and
a processing device coupled to the memory device to control:
receiving data indicative of occurrence of a plurality of events;
determining respective event log types for the received plurality of events;
associating respective identifiers including a corresponding counter for each of the determined event log types;
determining a best bit to event ratio to identify a bit-size of the corresponding counter to be used for each of the determined event log types, wherein the best bit to event ratio is based at least upon a number of times that the corresponding determined event log types occurred in previous operations;
changing a size of the respective identifier including the bit-size of the corresponding counter based at least upon the corresponding determined best bit to event ratio;
updating corresponding counter values to count a number of occurrence of associated event log type; and
storing the updated counter values and corresponding associated event log data including the respective identifiers and the determined event log types to the memory device; and
wherein the size of each of the identifiers is based on a parameter and the parameter is:
a quantity of the plurality of events; or
a size of a memory space for storing each of the identifiers and associated counters.

2. The system of claim 1, wherein the associated respective identifiers include a unique identifier for each of the plurality of events.

3. The system of claim 1, wherein the received data comprise a listing of each event occurring during a particular period of time.

4. The system of claim 1, wherein the processing device is configured to determine if the event log type is an error event.

5. The system of claim 1, wherein the processing device is configured to update a counter value associated with each identifier in response to performance of an event associated with the respective identifier.

6. The system of claim 5, wherein the processing device is configured to generate histogram data from the determined event log types and the updated counter values.

7. The system of claim 6, wherein the processing device is configured to display the histogram data.

8. A method, comprising:
receiving data indicative of occurrence of a plurality of events;
determining respective event log types for the received plurality of events;
associating respective identifiers including a corresponding counter for each of the determined event log types;
determining a best bit to event ratio to identify a bit-size of the corresponding counter to be used for each of the determined event log types based at least upon a number of times that the corresponding determined event log types occurred in previous operations;
changing a size of the respective identifier including the bit-size of the corresponding counter based at least upon the corresponding determined best bit to event ratio;
updating corresponding counter values to count a number of occurrence of associated event log type; and
storing the updated counter values and corresponding associated event log data including the respective identifiers and the determined event log types to a memory device; and
wherein the size of each of the identifiers is based on a parameter and the parameter is:
a quantity of the plurality of events; or
a size of a memory space for storing each of the identifiers and associated counters.

9. The method of claim 8, wherein the storing is triggered by a triggering event that includes a power down of a system.

10. The method of claim 8, further comprising: detecting an occurrence of a triggering event; and storing the updated counter values in response to the detected occurrence of the triggering event.

11. The method of claim 8, further comprising generating histogram data using the determined event log types and the corresponding identifiers and counter values.

12. The method of claim 8, wherein the event log data includes the identifier associated with each of the determined event log types.

13. The method of claim 10, wherein the triggering event includes a detection of an end of a time period.

14. The method of claim 13, wherein the time period includes particular intervals of time.

15. The method of claim 8, wherein the bit-size of the counter is based at least upon the event to bit ratio of an estimated number of times that the determined event log types occur in a lifetime of the system and an amount of storage space for each counter.

16. A system, comprising:
a memory device; and
a processing device coupled to the memory device and configured to perform operations comprising:
receiving data indicative of a plurality of events;
determining respective event log types of the received plurality of events;
associating a respective identifier including a corresponding counter for each of event log types;
determining a best bit to event ratio to identify a size of the corresponding counter to be used for each of the event log types, wherein the best bit to event ratio is based at least upon a number of times that the corresponding event log types occurred in previous operations;
changing a size of the respective identifier including the size of the corresponding counter based at least upon the corresponding determined best bit to event ratio;
updating corresponding counter values to count a number of occurrence of associated event log type;
detecting an occurrence of a triggering event that includes a power down of the system;
in response to the detected occurrence of the triggering event, storing the updated counter values and corresponding associated event log data including the respective identifiers and the determined event log types to the memory device; and
generating histogram data comprising occurrences of each of the plurality of events and the event log types; and
wherein the size of each of the identifier is based on a parameter and the parameter is:
a quantity of the plurality of events; or
a size of a memory space for storing each of the identifiers and associated counters.

* * * * *